(12) United States Patent
Vasudevan

(10) Patent No.: US 7,117,280 B2
(45) Date of Patent: Oct. 3, 2006

(54) NETWORK BASED INTRA-SYSTEM COMMUNICATIONS ARCHITECTURE

(75) Inventor: Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 09/750,198

(22) Filed: Dec. 27, 2000

(65) Prior Publication Data

US 2004/0225805 A1    Nov. 11, 2004

(51) Int. Cl.
  *G06F 13/00* (2006.01)
(52) U.S. Cl. ............ 710/100; 710/301; 710/302; 710/303; 710/304; 710/305; 709/250; 370/352
(58) Field of Classification Search ........ 710/305, 710/100, 301–304, 107; 709/250; 370/352
See application file for complete search history.

(56) References Cited

U.S. PATENT DOCUMENTS

| | | | | |
|---|---|---|---|---|
| 6,009,480 A | * | 12/1999 | Pleso ................... 710/103 |
| 6,067,407 A | * | 5/2000 | Wadsworth et al. ....... 395/200 |
| 6,311,165 B1 | * | 10/2001 | Coutts et al. ............. 710/8 |
| 6,324,608 B1 | * | 11/2001 | Papa et al. ............. 710/103 |
| 6,370,599 B1 | * | 4/2002 | Anand et al. .............. 710/15 |
| 6,456,632 B1 | * | 9/2002 | Baum et al. ............ 370/490 |
| 6,529,978 B1 | * | 3/2003 | Eide et al. .............. 710/104 |
| 2002/0004898 A1 | * | 1/2002 | Droge .................... 713/151 |
| 2002/0083228 A1 | * | 6/2002 | Chiloyan et al. ........... 710/9 |
| 2003/0067884 A1 | * | 4/2003 | Abler et al. ............. 37/252 |
| 2004/0008709 A1 | * | 1/2004 | Einbinder et al. ........ 370/419 |

* cited by examiner

*Primary Examiner*—Rehana Perveen
*Assistant Examiner*—Kim T. Huynh
(74) *Attorney, Agent, or Firm*—Blakely, Sokoloff, Taylor & Zafman LLP

(57) ABSTRACT

An architecture and method that enables communication between applications and peripheral devices through use of network-type messaging. The architecture is exemplified by a machine having a mainboard that includes memory and one or more processors. The mainboard also includes one or more expansion slots for receiving various peripheral device cards. The processor(s) is enabled to communicate with peripheral devices via an internet network that includes network interfaces for both the processor and each of the peripheral devices. The network interfaces include a network port and a network address that is bound to the network port by means of a network socket. Socket application program interface (API) and network abstraction layers are provided by software means to enable applications to communicate with the peripheral devices using network messaging and protocols, such as TCP/IP over an Ethernet.

26 Claims, 4 Drawing Sheets

NETWORK BASED INTRA-SYSTEM COMMUNICATIONS ARCHITECTURE

BACKGROUND OF THE INVENTION

1. Field of the Invention

The present invention generally concerns computer architectures, and in more particular concerns an architecture that provides intra-device interfacing via network-like messaging.

2. Background Information

A typical computer includes a main board or motherboard that includes one or more processors and provides various hardware interfaces for connecting peripheral devices to the motherboard. For example, personal computers (PCs) generally include a set of expansion "slots" into which peripheral cards can be inserted to provide certain functions, such as video, network interfacing, modem, auxiliary disk control, etc. Under conventional architectures, communication between the processor and the peripheral cards is enabled through a communications bus, such as the PCI bus or ISA bus. Accordingly, software application programs can communicate with peripheral devices through either direct system calls (e.g., direct writes or reads from memory) or through calls made to an operating system, which then will pass or retrieve the desired data either directly or through a device driver.

There are several problems with the conventional architecture. For example, some multiprocessor computer architectures do not enable peripheral devices to be shared between the processors, in a manner that scales across computers. Other multiprocessor architectures that allow such sharing present bus contention problems that may restrict access to the peripheral devices. Another problem with conventional architectures, such as the PCI bus, is that the bus speeds are insufficient to take advantage of higher-bandwidth communication links (e.g., present Gigabit/sec Ethernet networks and future 10 Gigabit/sec networks.

Another problem is security; configuration information can often be easily changed such by unauthorized users that the resource conflicts or other problems arise. For example, conventional bus architectures do not have any built-in security measures. As a result, unauthorized users may delete or corrupt bus and/or resource configuration information. This problem is exacerbated by today's distributed environment, wherein changes on one machine may adversely effect other machines connected to the network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides an architecture scheme that enables communication between application programs and internal peripheral devices through use of network-like messaging. Through application of both software and hardware interfaces, an application and a peripheral device are enabled to establish a connection using standard network protocols and communication standards, such as TCP/IP over an Ethernet.

Figure 1:
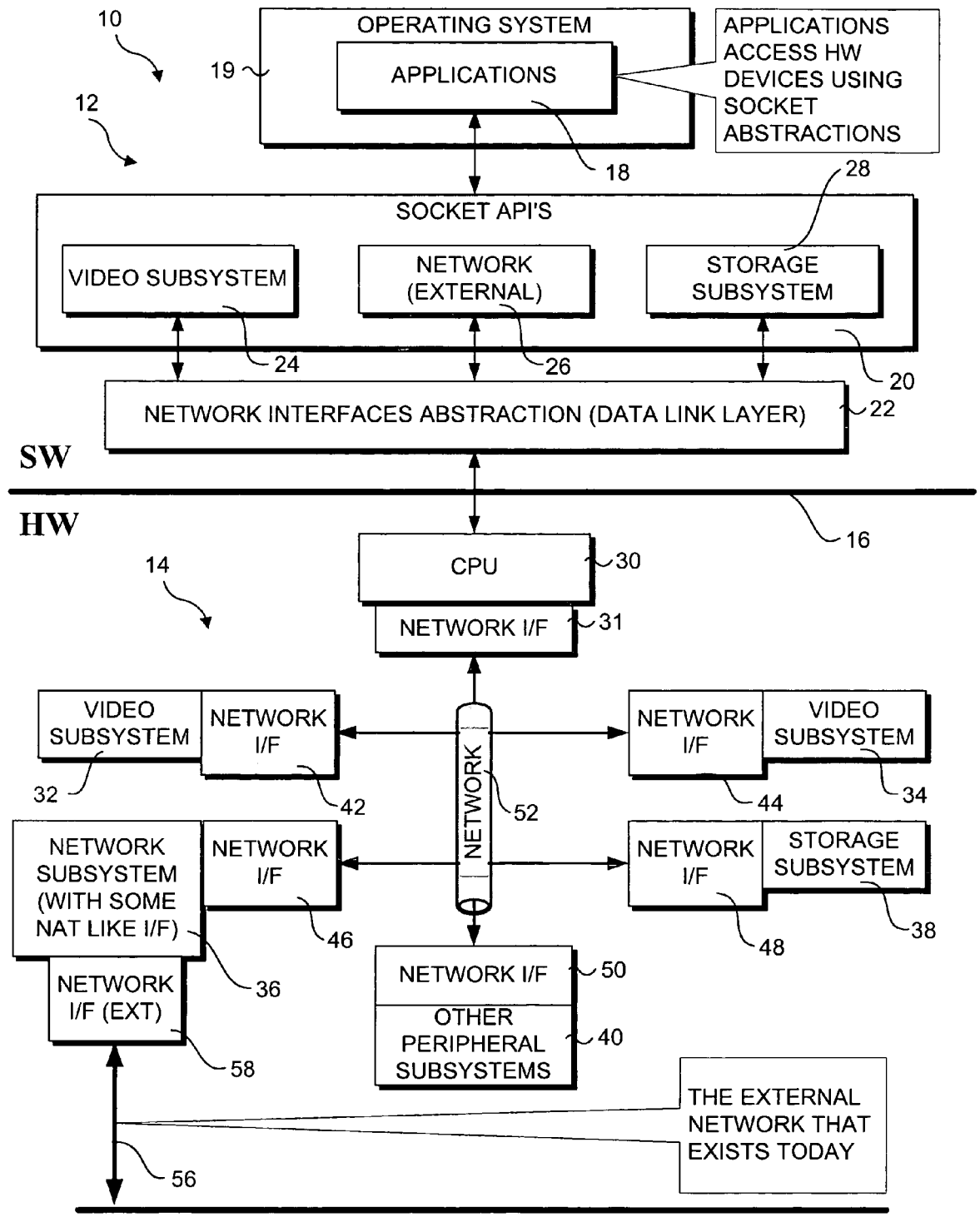
FIG. 1 is a schematic block diagram showing a high-level view of an exemplary hardware and software architecture embodiment of the present invention.

FIG. 1 illustrates an exemplary architecture 10 embodiment of the present invention. Architecture 10 is divided into two portions: a software (SW) portion 12 depicted in the upper half of FIG. 1 and a hardware (HW) portion 14 depicted in the lower half of the Figure, with each portion being logically separated by a line 16.

Software portion 12 comprises three layers, including an application layer 18, as depicted by an application, a socket API (application program interface) layer 20, and a network interfaces abstraction layer 22, also referred to herein as a data link layer. Application layer 18 may optionally include an operating system 19. Application programs running in application layer 18 are enabled to access various hardware devices through use of socket API's corresponding to those devices operating in socket API layer 20 (as depicted by a video subsystem socket API 24, a external network socket API 26, and an storage subsystem API 28), and logical to physical device interface mapping provided by network interface abstraction layer 22.

Hardware layer 14 includes a CPU 30, a video subsystem 32, a memory subsystem 34, a network subsystem 36, a storage subsystem 38, and other peripheral subsystems 40. As used herein, the function of each subsystem may typically be performed by a corresponding "peripheral device." The subsystems are connected to CPU 30 via respective network interfaces (I/F) 42, 44, 46, 48, and 50, each of which is connected to a network 52. In addition, CPU 30 may be connected to an external network 56 via network subsystem 36, an external network interface 58, and network interface 46.

Figure 2:
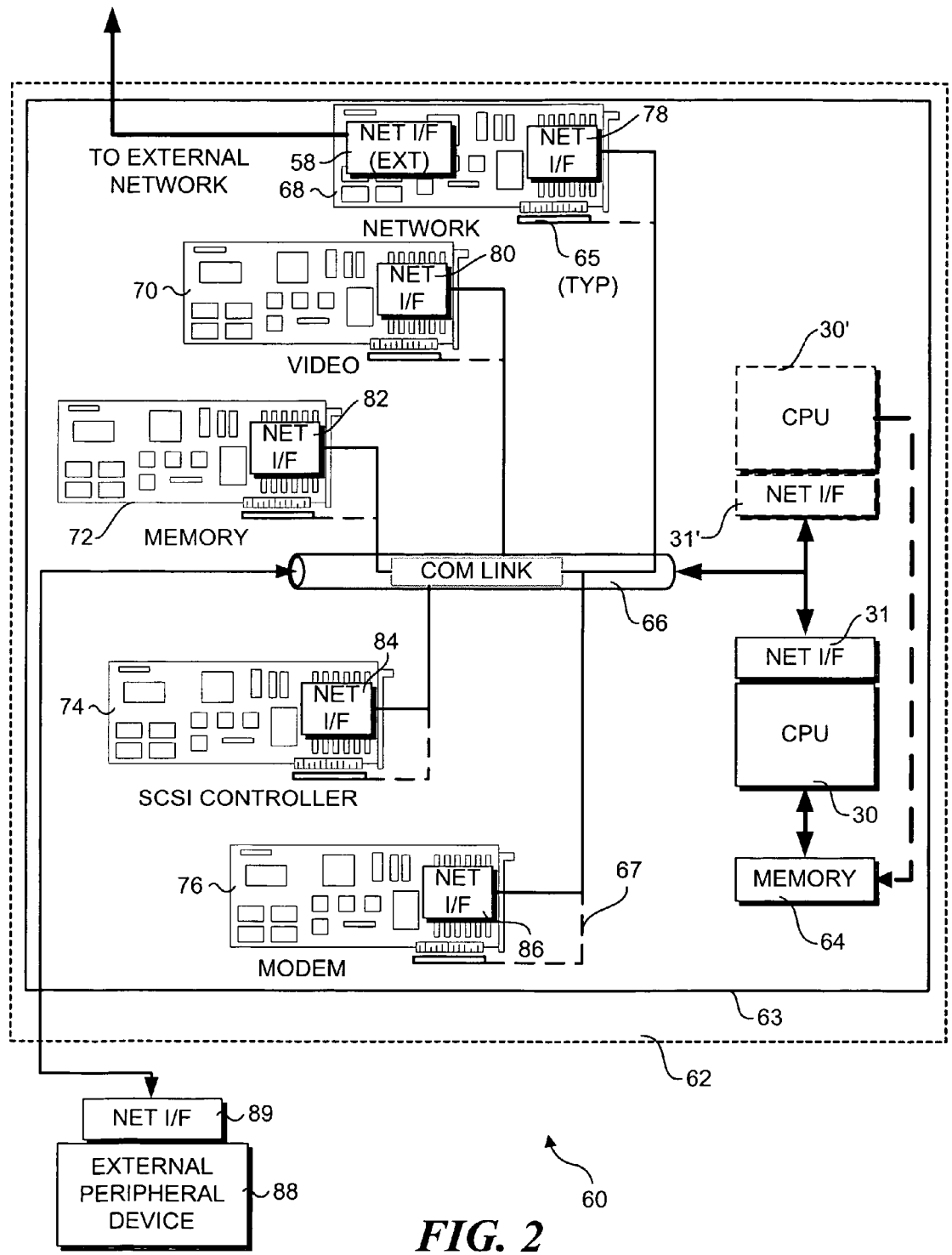
FIG. 2 is a schematic diagram illustrating an exemplary configuration of the architectural scheme of FIG. 1.

Each of network interfaces 42, 44, 46, 48, and 50 may reside on the same board or within the same device housing as their corresponding subsystem or peripheral device, or may be disposed apart from their corresponding subsystem, with a communications link between the two. For example, FIG. 2 illustrates an exemplary configuration 60 in which a plurality of peripheral cards are disposed within a computer housing 62 and linked in communication to a CPU 30 and network interface 31 via an internal communication link 66 and/or a network bus 67. CPU 30 and network interface 31 are mounted on a mainboard 63 that further includes memory 64 and a plurality of expansion slots 65. The peripheral cards include a network card 68, a video card 70, a memory card 72, a SCSI controller card 74, and a modem card 76. Each of the peripheral cards may also include a respective network interface, as depicted by network interfaces 78, 80, 82, 84, and 86, or such network interfaces may be built into mainboard 64 in proximity to one or more of the expansion slots used to connect a peripheral card to the mainboard. Each of the network interfaces includes a network port that provides a physical input point for connecting the network interface to a network.

Some or all of the cards may be connected to communications link 66 via a respective network connector using standard network cabling. Optionally, some or all of the cards may be connected via a standard or auxiliary edge connector and corresponding slot 65 to network bus 67.

As discussed above, in some instances it may be desired to connect to one or more peripheral devices that are located outside of the computer, such as an external peripheral device 88. This can be accomplished in a similar manner as internal peripheral devices by implementing an appropriate network interface for the external peripheral device, as exemplified by a network interface 89.

Communications link 66 and network bus 67 preferably are implemented using a network communications standard. For example, communications link 66 or network bus 67 may comprise an Ethernet subnet, a token ring, or an FDDI (Fiber Distributed Data Interface) subnet. Applicable standards for Ethernet systems are provided by the IEEE 802.3 standards group. Preferably, an Ethernet implementation will support the Gigabit Ethernet standard (1000 Base ×), although the Fast Ethernet standard (100 BaseT) may also be used One advantage with architecture 10 is that it is easily scalable. For example, the scheme may be used to enable a plurality of processors to share peripheral devices. This is depicted in FIG. 2 by a second CPU 30' and a corresponding network interface 31'. By enabling communication with peripheral devices using a network protocol, bus contention issues that are often present with multiprocessor machines are avoided.

Figure 3:
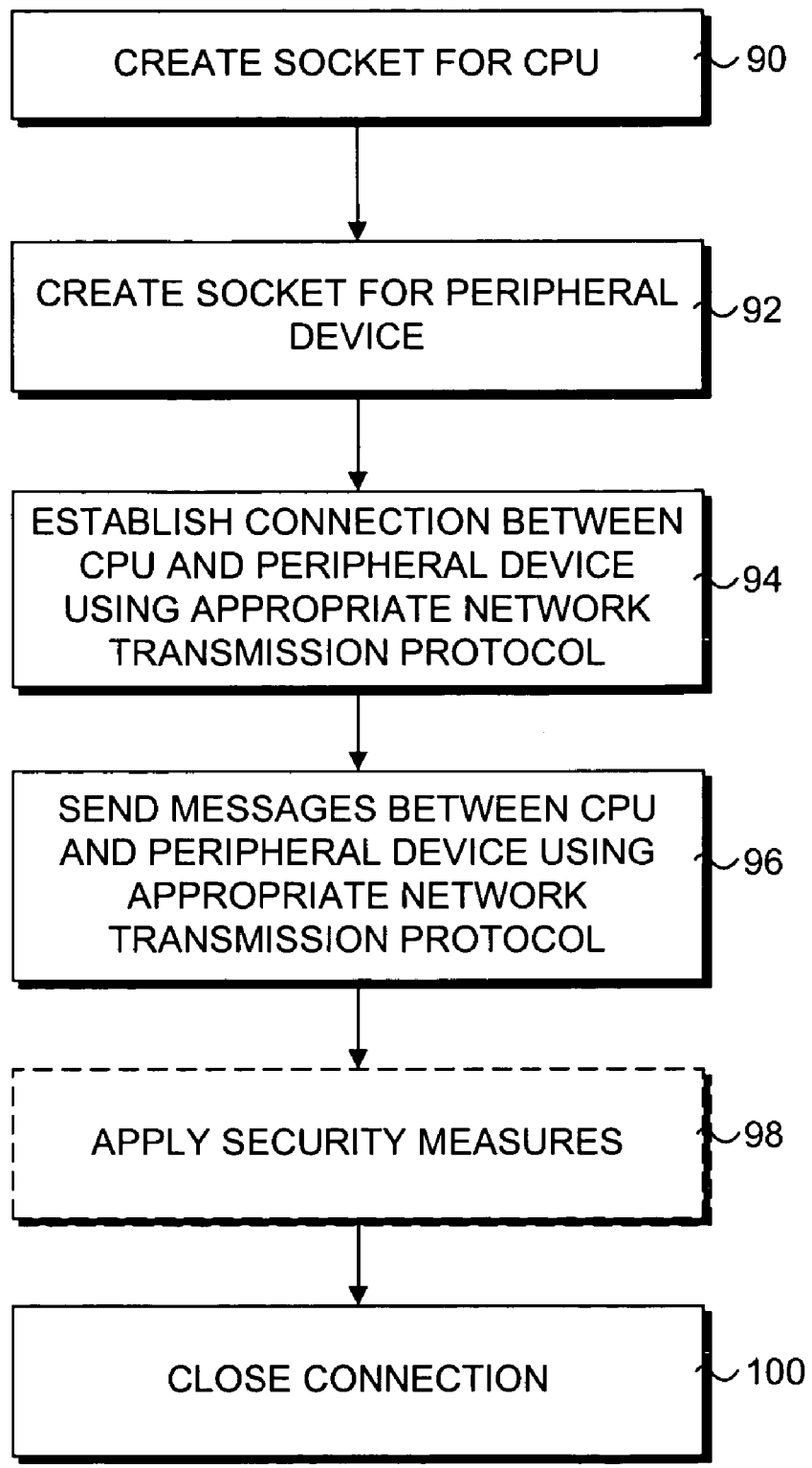
FIG. 3 is a flow chart illustrating the logic used by the invention to enable communication between a processor and a peripheral device.

A flowchart illustrating the logic used by the invention in providing communication between a processor and a peripheral device is shown in FIG. 3. The process starts by creating a socket for each of the processor(s) and the peripheral device that is desired to be communicated with, which are respectively provided by blocks 90 and 92. A socket is a software entity that provides the basic building block for interprocess communications, and functions as an endpoint of communication between processes. For example, for IPX addresses, a fully named pair of sockets uniquely identify a connection between two communicating sides:

<<network.node.port><network.node.port>> wherein network is the four-byte network address, node is the six-byte card address, and port is two bytes identifying the program or process. Accordingly, creating a socket binds an object (i.e., the processor or peripheral device) to an address that is used for communicating with the object. These addresses enable objects connected to the network to be referenced as network "nodes."

Sockets may generally be created via operating system 19 and/or communication drivers for processor and any peripheral devices that are to be accessed via the internal network in the system. In addition, some peripheral devices may automatically create a socket when they are initially powered up.

In a block 94, a connection is established between the processor and the peripheral device using an appropriate network transmission protocol, such as TCP/IP or UDP, or any other standard network transmission protocols, each of which are well-known in the art. Once a connection has been established, messages can be sent between the processor and the peripheral device using the selected network transmission protocol.

Another advantage of the present architecture is that built-in network facilities, such as security measures, may be used without requiring such facilities to be built into applications or into the peripheral devices themselves. Accordingly, such network security measures may optionally be applied to the connection, as provided by a block 98. At the conclusion of the communication between the processor and the peripheral device the channel preferably is closed in a block 100.

Figure 4:
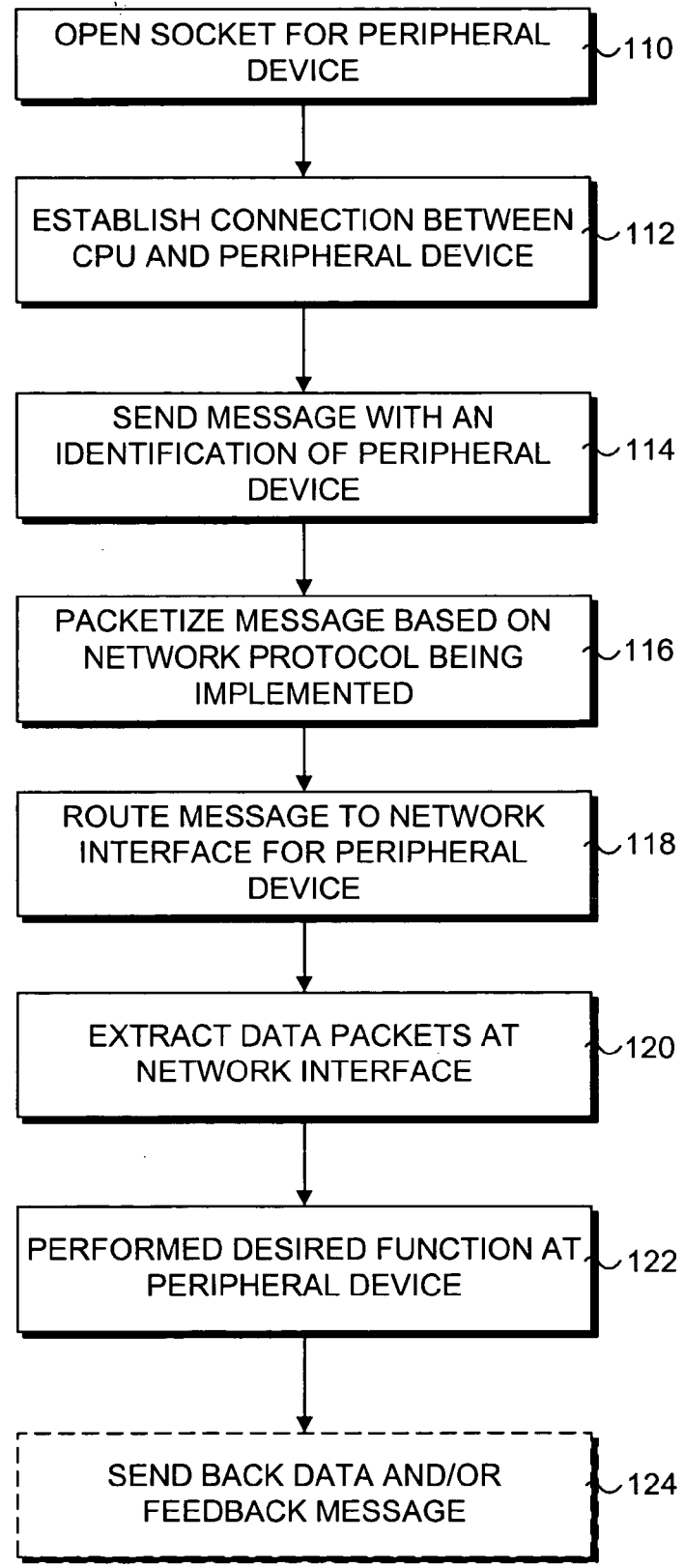
FIG. 4 is a flow chart illustrating the logic used by the invention to enable communication between an application and a peripheral device.

With reference to FIG. 4 an application program may access a peripheral device in the following manner. The application begins the process by opening sockets corresponding to the processor and the peripheral device the application desires to access in a block 110 (at this point sockets for the processor and the peripheral device have already been created). A connection between the application and the peripheral device is then established in a block 102. In a block 114 the application sends a message via the socket to network interface abstraction layer 22. The network interface abstraction layer or network interface 31 packetizes the message for an appropriate network protocol, such as TCP/IP or UDP, as provided by a block 116. The message packets are then sent out and routed over the internal network to the peripheral device in a block 118. Next, in a block 120, the packets are extracted by the network interface corresponding to the peripheral device, and reassembled, as necessary. The message can then be processed by the peripheral device to perform a desired function, as provided by a block 122. For example, the message may tell a video subsystem to draw a rectangle on a display. At this point, the process may be complete. Optionally, the peripheral device may send back data and/or a feedback message via the internal network to the application in a block 124.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A system comprising:
   a housing;
   a mainboard disposed within the housing to which memory and a first processor are connected, said mainboard providing a first network interface operatively coupled to the first processor having a first network port and a first network address;
   a first peripheral device disposed within the housing;
   a second network interface operatively coupled to the mainboard, providing a second network port and a second network address, the second network interface linked in communication with the first peripheral device; and
   a communications link between the first and second network interfaces substantially disposed within the housing, the communications link using packetized messages based on a network transmission protocol to provide communication between the first processor and the first peripheral device, wherein the first and second network interfaces are both coupled to insert data received from the processor and the first peripheral device, respectively, into the packetized messages prior to transmitting the data onto the communications link and to extract the data from the packetized messages received from the communications link prior to providing the data to the processor and the first peripheral device, respectively.

2. The system of claim 1, wherein the communications link and the first and second network interfaces comprise an Ethernet subnet.

3. The system of claim 1, wherein the communication link comprises a network signal bus built into the mainboard.

4. The system of claim 1, wherein the communications link comprises a token ring.

5. The system of claim 1, wherein the second network interface is built into the first peripheral device.

6. The system of claim 1, wherein the second network interface is built into the mainboard.

7. The system of claim 1, wherein the peripheral device comprises one of a video subsystem, a memory subsystem, a disk controller and a modem.

8. The system of claim 1, wherein the mainboard further includes a second processor connected to a third network interface having a third network address and network port connected to the communications link.

9. A method for enabling communication between a peripheral device disposed within a computing machine having a processor and an application running on the processor, comprising:
   providing a network interface for each of the processor and the peripheral device;
   providing a communication link between the network interfaces of the processor and the peripheral device;
   creating a network software socket for each of the processor and the peripheral device;
   establishing a connection between the processor and the peripheral device;
   separating data received at the network software socket for the processor into packetized messages including network transmission protocol information within the packetized messages;
   transferring the packetized messages from the processor to the peripheral device within the packetized messages over the communication link; and
   extracting the data from the packetized messages received over the communication link at the peripheral device.

10. The method of claim 9, wherein the network transmission protocol comprises the TCP/IP protocol.

11. The method of claim 9, further comprising applying security measures to determine if an application may connect to a particular peripheral device.

12. The method of claim 9, wherein the network transmission protocol comprises the UDP protocol.

13. The method of claim 9, wherein the communications link and the network interfaces comprise an internal Ethernet network.

14. The method of claim 9, wherein the communications link and the network interfaces comprise an internal token ring network.

15. The system of claim 1, further comprising:
    a storage device on which software is stored, the software comprising machine instructions that are executable by the first processor that includes a socket application program interface (API) that binds the address of the first peripheral device to the second network port and a network interface abstraction layer that provides an abstracted interface that enables an application to communicate with the first peripheral device using a networking protocol.

16. An apparatus, comprising:
    a housing;
    a first processor disposed within the housing;
    a first network interface coupled to the first processor, the first network interface having a first network address;
    a peripheral device disposed within the housing;
    a second network interface coupled to the peripheral device and having a second network address; and
    a network communication link disposed within the housing and coupled to communicate packetized messages based on a network transmission protocol between the first network interface and the second network interface to provide communication between the first processor and the peripheral device within the housing, wherein the first and second network interfaces are both coupled to insert data received from the processor and the peripheral device, respectively, into the packetized messages prior to transmitting the data onto the network communication link and to extract the data from the packetized messages received from the network communication link prior to providing the data to the processor and the peripheral device, respectively.

17. The apparatus of claim 16, wherein a software application executable by the first processor communicates with the peripheral device via a connection over the network communication link associating the first network address with the second network address.

18. The apparatus of claim 17, wherein the first network interface includes a first port address in addition to the first network address to create a first software socket for communicating with the processor and wherein the second network interface includes a second port address in addition to the second network address to create a second software socket for communicating with the peripheral device.

19. The apparatus of claim 16, wherein the network communications link comprise an Ethernet subnet.

20. The apparatus of claim 16, wherein the second network interface comprises a built-in network interface included within the peripheral device.

21. The apparatus of claim 16, wherein the peripheral device comprises a video card.

22. The apparatus of claim 16, wherein the peripheral device comprises a modem card.

23. The apparatus of claim 16, wherein the peripheral device comprises an external network interface to couple to an external network external to the housing.

24. The apparatus of claim 23, wherein the external network interface includes a network address translation ("NAT") device to translate network addresses between the external network and the network communication link.

25. The apparatus of claim 16, further comprising:
a second processor disposed within the housing; and
a third network interface coupled to the second processor and to the network communications link, the third network interface having a third network address to communicate with the peripheral device via the network communication link.

26. The apparatus of claim 16, further comprising a motherboard disposed within the housing, the motherboard including the first processor and the peripheral device mounted thereon.

* * * * *